(12) United States Patent
Spongberg

(10) Patent No.: US 6,848,803 B2
(45) Date of Patent: Feb. 1, 2005

(54) ILLUMINATED HALLOWEEN COSTUME

(75) Inventor: Rod Spongberg, Long Beach, NY (US)

(73) Assignee: Chosun International, Inc., New York, NY (US)

(*) Notice: Subject to any disclaimer, the term of this patent is extended or adjusted under 35 U.S.C. 154(b) by 278 days.

(21) Appl. No.: 10/124,834

(22) Filed: Apr. 18, 2002

(65) Prior Publication Data

US 2002/0154497 A1 Oct. 24, 2002

Related U.S. Application Data

(60) Provisional application No. 60/284,719, filed on Apr. 18, 2001.

(51) Int. Cl.⁷ .............................................. F21V 21/08
(52) U.S. Cl. ........................ 362/103; 362/554; 362/565; 362/806
(58) Field of Search ............................... 362/551, 554, 362/555, 570, 565, 103, 108, 800, 806, 812

(56) References Cited

U.S. PATENT DOCUMENTS

| | | | | |
|---|---|---|---|---|
| 3,815,986 A | * | 6/1974 | Darbee | 355/1 |
| 4,234,907 A | * | 11/1980 | Daniel | 362/556 |
| 4,329,739 A | * | 5/1982 | Loebner | 362/153 |
| 4,422,719 A | * | 12/1983 | Orcutt | 385/123 |
| 4,519,017 A | * | 5/1985 | Daniel | 362/565 |
| 4,727,603 A | * | 3/1988 | Howard | 2/115 |
| 4,752,114 A | * | 6/1988 | French | 385/115 |
| 4,780,798 A | * | 10/1988 | Iida | 362/582 |
| 4,875,144 A | * | 10/1989 | Wainwright | 362/103 |
| 5,021,928 A | * | 6/1991 | Daniel | 362/556 |
| 5,149,190 A | | 9/1992 | MacKenzie | |
| 5,330,465 A | * | 7/1994 | Doiron et al. | 606/7 |
| 5,631,994 A | * | 5/1997 | Appeldorn et al. | 385/147 |
| 5,649,755 A | | 7/1997 | Rapisarda | |
| 5,818,998 A | * | 10/1998 | Harris et al. | 385/100 |
| 6,347,941 B1 | * | 2/2002 | Boston | 433/165 |
| 2003/0174978 A1 | * | 9/2003 | Veligdan | 385/120 |

* cited by examiner

Primary Examiner—Thomas M. Sember
Assistant Examiner—Hargobind S. Sawhney
(74) Attorney, Agent, or Firm—Kirkpatrick & Lockhart LLP; Anthony H. Handal

(57) ABSTRACT

An illuminated costume promoting safety is disclosed. The inventive costume comprises a light distributing assembly, comprising a light source and a plurality of light outputting members optically coupled to the light source, each of the members having a light outputting surface. The light outputting members have first and second member ends. The first member end are optically coupled to the light source. Each of the members has a light outputting surface on its second member end, wherein the light outputting members have various lengths. The light outputting members come in at least four different lengths. In accordance with the preferred embodiment of the present invention the light source is a light-emitting diode which is driven by either a battery which maintains the light emitting diode active emitting light all times, or the light source may be driven by a battery powered transistorized power source which causes the lights to blink or follow any other pattern desired.

20 Claims, 6 Drawing Sheets

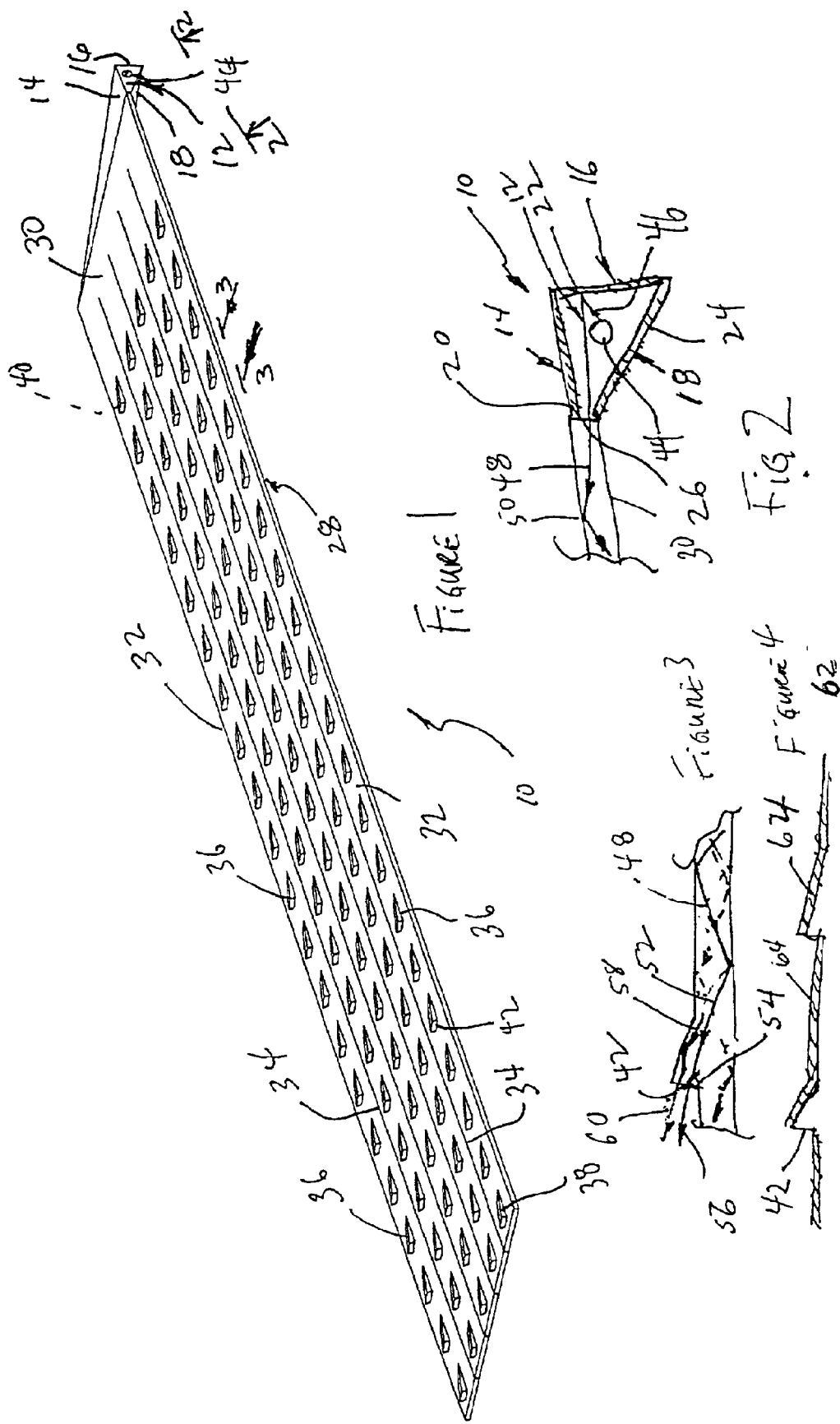

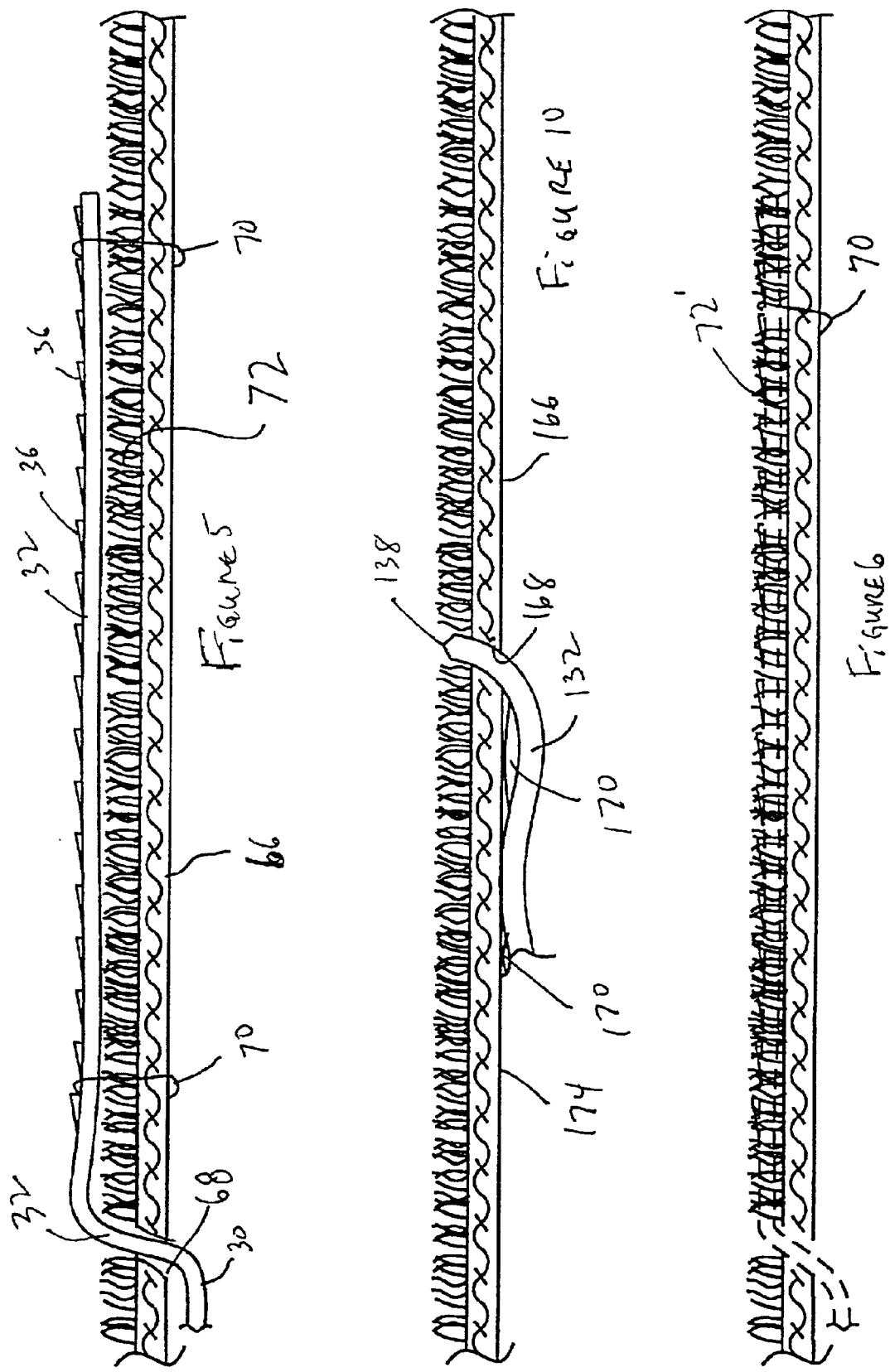

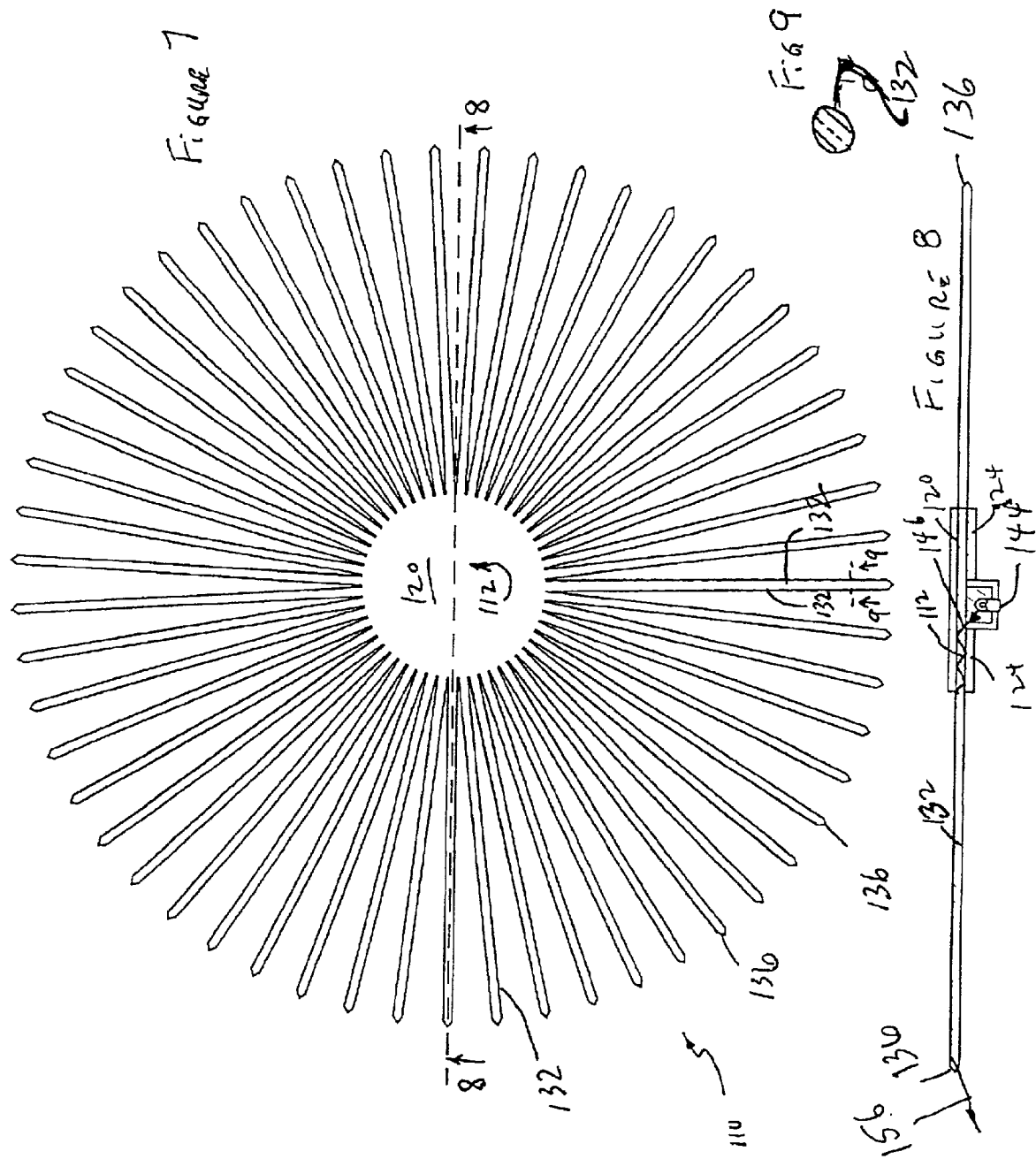

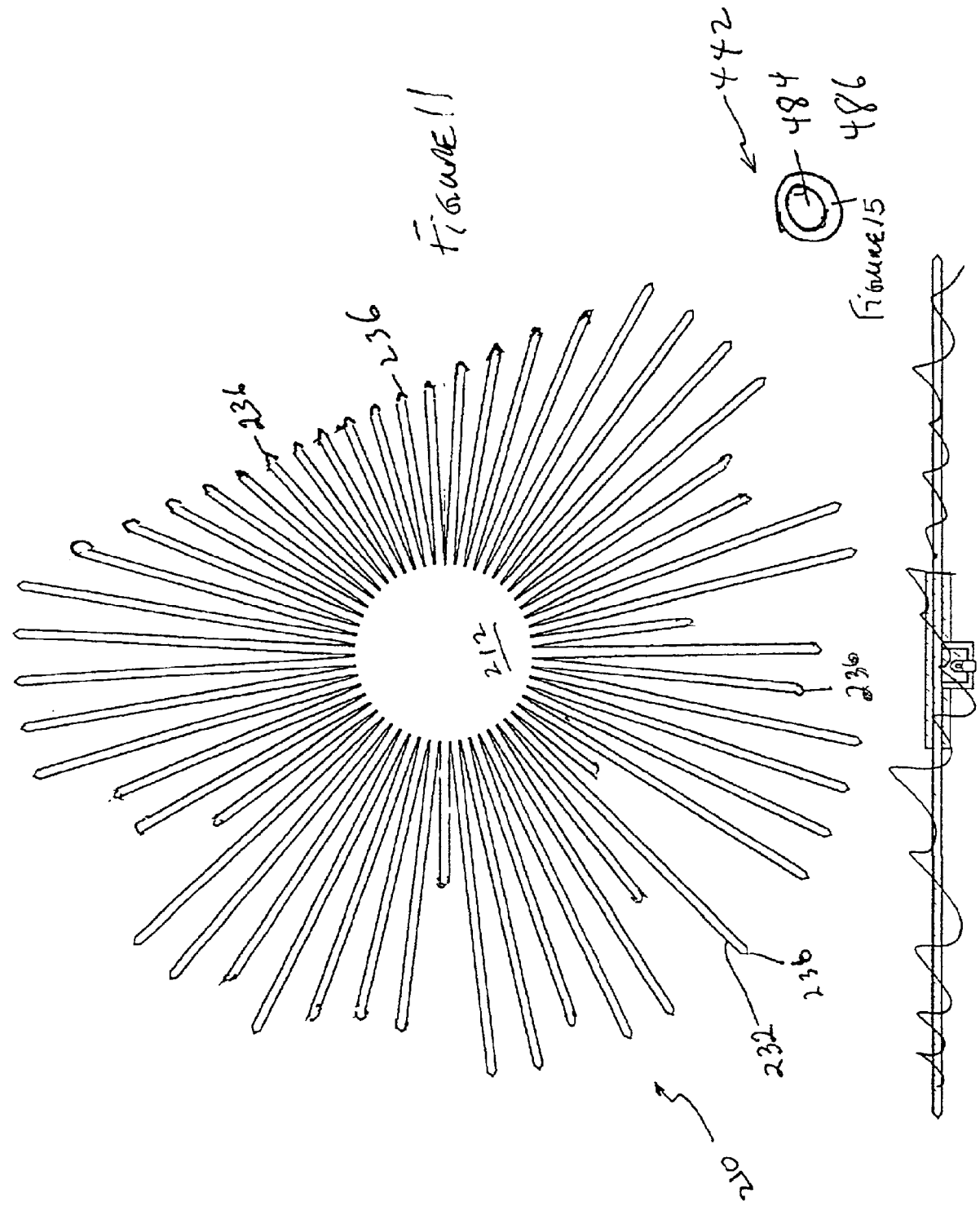

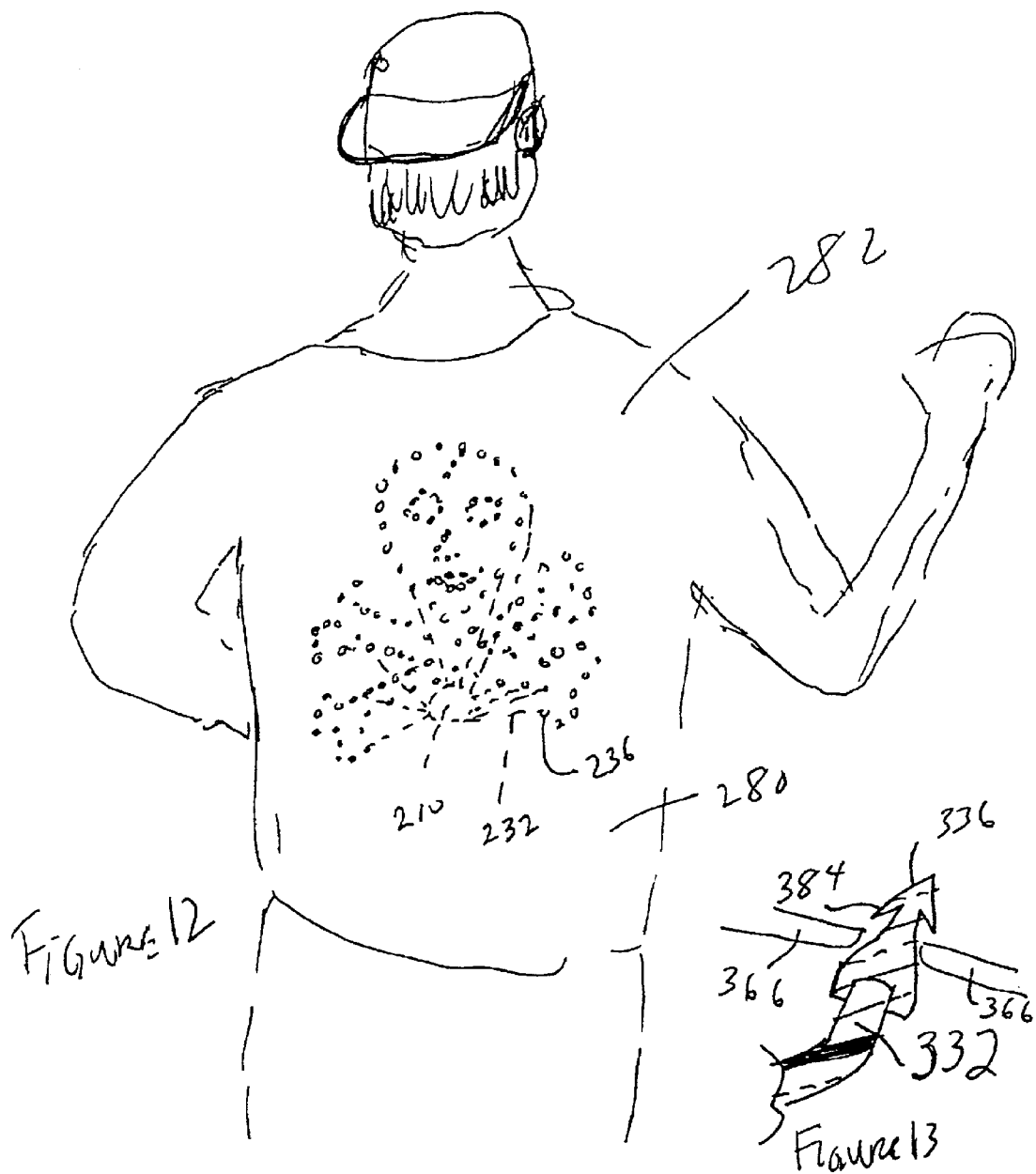

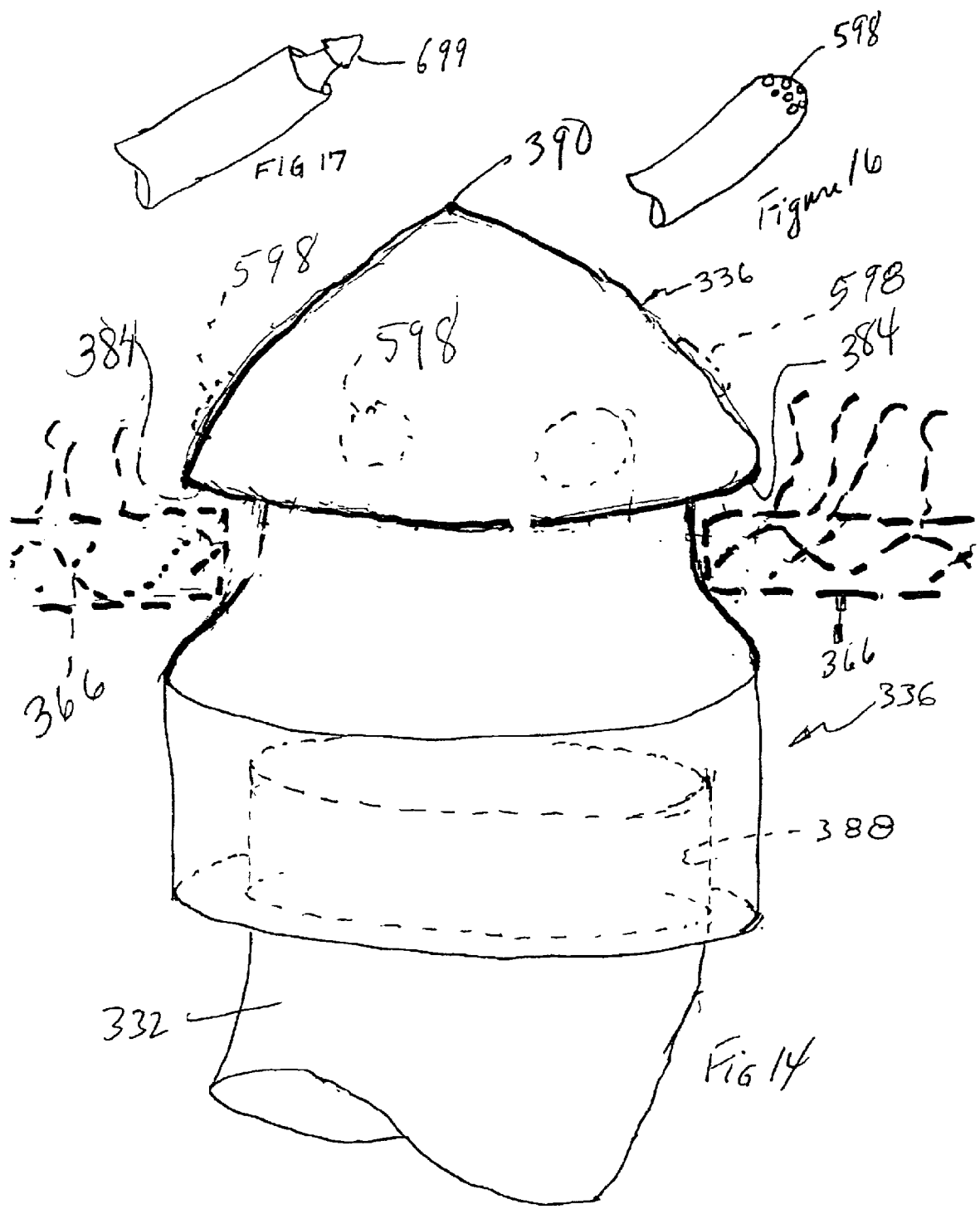

ILLUMINATED HALLOWEEN COSTUME

This application claims the benefit of Provisional Application No. 60/284,719, filed Apr. 18, 2001.

TECHNICAL FIELD

The present invention relates to costumes with lights and, in particular, costumes of the type worn by children at night on Halloween and has as its objective promoting visibility in an attractive manner while preserving cost efficiency.

STATEMENT REGARDING FEDERALLY SPONSORED RESEARCH OR DEVELOPMENT

Not Applicable.

BACKGROUND

The shortened days of late fall are near their shortest by the time All Hallows Eve or "Halloween" comes around. Nevertheless, it is during this time that almost the entire population of children in the United States is put at risk on a single evening by reason of the ritual of "trick or treating" during the eve of All Hallows. On this evening, children wander from door-to-door, and house-to-house, dancing across streets and through streets at a time when there's a relatively large amount of traffic on account of such events and people driving back to their homes after working all day, and driving off to the grocery store to buy something for their evening meals.

The high concentration of children on the road, during such a busy part of the day presents a higher likelihood that children will be struck by unwary drivers. Indeed, not only is traffic quite high during the early evening, but this time of day is after many people have put in a hard full day of work and are more prone than they might be at other times to speeding, not paying attention, or simply fatigued and not at their best in reacting to dangerous situations. Anything which would promote the likelihood of a child being seen before it is too late to avoid an accident would be of real value.

One way of avoiding accidents is simply to use clothing which is visible, such as clothing which is bright in color. For example, policemen often wear vests in fluorescent orange, or the like. People are encouraged not to wear black clothing at night, when they are walking the dog, taking a stroll or the like.

Evolving from homemade get ups that reach back into our earliest history, commercially available Halloween costumes have been commonplace during the past half-century. The use of lights in children's Halloween costumes, as is proposed in accordance with the present invention, is believed to be a natural and reliably implemented solution to the problem of increasing the visibility of children on Halloween night. Nevertheless, it appears that the same is largely nonexistent in any form, despite the strong need for such a valuable system.

Clothing with light displaying members is, of course, well known and will improve the likelihood that a child will not be injured on Halloween night. Perhaps the most common expedient in this area is the use of retro reflecting materials, such as tape incorporating retroreflective beads. Retroreflection can also be promoted through the use of molded plastic members with flat interfaces and faceted backs, which promote total internal reflection of incoming light in a direction diametrically opposed to the direction of the incident light. The result is to produce a strong reflection in a direction aimed at the source of incident light. For example, if the light falling on a retroreflective device originated from the headlights of an automobile, light will be reflected in a column generally aimed at the source automobile headlight, and this, will generally be broad enough to include a substantial amount of reflected light reflected toward the eyes of the driver.

However, being merely reflective, retroreflective members will not work where lights are not being used, as in the case of a negligent driver, or the driver of a vehicle such as a bicycle, or the like. Moreover, motorcycles may not be effective to illuminate retroreflective members on children, because of the relatively poor nature of their road illumination systems. Even cars may not do a good job in this area if headlights are out of alignment or burned-out.

In response to the inadequacies of reflective members, light-emitting systems have evolved. See, for example, U.S. Pat. No. 5,649,755 to Rapisarda, which discloses wearing apparel incorporating a flexible light-transmitting assembly comprising a clear flexible polymer tape with a plurality of tooth shaped protrusions which provide reflecting points of light. However, such tape is relatively cumbersome and unsightly from an aesthetic standpoint. While a tape can be made more aesthetically acceptable by using it in a symmetrical fashion, for example as a pair of stripes on the arms of a person's jacket, as illustrated in Rapisarda, the end result is far from pleasing and will have an adverse impact on a highly decorated article of clothing such as a Halloween costume. While it has been suggested that flashing electrical light sources including light-emitting diodes can be applied to children's Halloween costumes to significantly enhance safety on Halloween evening, at least one device proposed, a flashing box-like device illustrated in U.S. Pat. No 5,149,190 of McKenzie, also fails to present a cost effective, aesthetic solution.

BRIEF SUMMARY OF THIEF INVENTION

In accordance with the present invention, an illuminated costume promoting safety is provided. The inventive costume comprises a light distributing assembly, comprising a light source and a plurality of light outputting members optically coupled to the light source, each of the members having a light outputting surface. The light outputting members have first and second member ends. The first member ends are optically coupled to the light source. Each of the members has a light outputting surface on its second member end. The light outputting members may have various lengths.

In accordance with the preferred embodiment of the present invention the light source is a light-emitting diode which is driven by either a battery which maintains the light emitting diode active emitting light at all times, or the light source may be driven by a battery powered transistorized power source which causes the lights to blink or follow any other pattern desired. The construction of such circuits is well-known in the art and forms no part of the invention.

The light outputting members are made of an optically transmissive material. The index of refraction of the optically transmissive material is selected to result in internal reflection between light traveling the length of the light outputting members on the inside of the light outputting members at the interface between the inside of the light outputting members and the space surrounding the light outputting members. Alternatively, hollow tubes with reflective insider may be used. The light outputting members have first and second member ends. The first member end is optically coupled to the light source. Each of the members have light outputting surface on its second member end. The light outputting members have a length.

A plurality of light outputting caps may also be provided. The outputting surface is defined on each respective light outputting cap. Each light outputting cap is associated with a respective light outputting member and secured to its respective second member end.

Each of the light outputting caps comprise a tapered member having a first end and a second end. The tapered member tapers along at least a portion of the tapered member to a smaller size from a relatively wide portion adjacent the second end. The first end is relatively pointed. The second end defines a surface shaped to bear against the first side of a fabric. A backing member has first and second surfaces. The first surface is configured to bear against the second side of the fabric. A hole is defined in the second surface of the backing member. The hole is configured and dimensioned to receive its respective second member end. A connection member is secured to the first surface of the backing member and the second end of the tapered member to define a space between the first surface of the backing member and the second end of the tapered member, the space being large enough to accommodate the fabric.

In accordance with another alternative embodiment of the invention, the light outputting members have a length defined between the first and second member ends and the second member end is configured to present a surface oriented with respect to light passing through the length to present an angle of incidence greater than the critical angle, whereby a relatively large proportion of light passing through the length is allowed to exit from the light outputting members.

In accordance with a preferred embodiment, the garment comprising fabric has an inside surface and an outside surface. The outside surface is exposed to view when the garment is worn by a person. The light outputting members are secured to the inside surface, and the second member ends extend through the fabric, visible to view when the garment is being worn on the outside surface of the fabric. The light outputting members may be secured by glue.

In accordance with still another embodiment of the invention, each of the members has a plurality of light outputting contours or discontinuities along its length. The discontinuities are positioned at a plurality of points along the length of the light outputting members. The discontinuities have at least one surface which is oriented at an angle with respect to radiation traveling inside of the light outputting members. The angle has a value which results in relatively high transmission to the space outside the member of radiation traveling inside the light outputting members, whereby the discontinuities serve as a plurality of output points for light input into the light outputting member with which the discontinuities are associated.

In accordance with the preferred embodiment, a light-emitting device is positioned within a transparent member. The transparent member has a surface area not performing the function of transmitting light into the plurality of light outputting members. The surface area not performing that function is coated with a reflective material to promote internal reflection of light produced.

BRIEF DESCRIPTION OF DRAWINGS

The advantages of the system and apparatus of the present invention will be understood from the following description taken together with the drawings, in which:

FIG. 1 is a perspective view of a first embodiment of the present invention;

FIG. 2 is a diagram showing the collection and channeling of light in cross-section taken along lines 2—2 of the embodiment illustrated in FIG. 1;

FIG. 3 is an illustration useful for showing the paths of various light rays in a section of a light conducting member in the embodiment of the present invention illustrated in FIG. 1;

FIG. 4 is a schematic diagram of a cross-section of a portion of an alternative light conducting member used in the embodiment of the present invention illustrated in FIG. 1;

FIG. 5 is a closeup illustration of a garment incorporating the embodiment of the present invention illustrated in FIG. 1;

FIG. 6 is a closeup illustration of an alternative arrangement of a garment incorporating the embodiment of the present invention illustrated in FIG. 1;

FIG. 7 is a plan view of a second embodiment of the present invention;

FIG. 8 is a cross-sectional view along lines 8—8 of the embodiment of the present invention illustrated in FIG. 7;

FIG. 9 is a schematic diagram of a cross-section along lines 9—9 of a finger element of the embodiment of the present invention illustrated in FIG. 7;

FIG. 10 is a closeup illustration of a garment incorporating the embodiment of the present invention illustrated in FIGS. 7-9;

FIG. 11 is a plan view of another embodiment of the present invention;

FIG. 12 is an illustration of a sweatshirt incorporating the present invention;

FIG. 13 is a schematic diagram in cross-section of a light emitting optical end member for use with the present invention;

FIG. 14 is prospective view of an optical end member for use with the present invention;

FIG. 15 is a cross-sectional view of an alternative embodiment of a light carrying member;

FIG. 16 is a view of a light-emitting arm and is yet another embodiment of the invention; and FIG. 17 is a view of a light-emitting arm and is still another embodiment of the invention.

DETAILED DESCRIPTION OF THE PREFERRED EMBODIMENTS

Referring to FIG. 1, a light distributing assembly 10 constructed in accordance with the present invention is illustrated. Assembly 10 comprises a transparent light receiving and distributing block 12 having a top facet 14, a side facet 16 and a bottom facet 18. As illustrated in FIG. 2, facets 14, 16 and 18 are coated with a layer of reflective material such as aluminum or reflective paint. In particular, facet 14 is covered with a layer of aluminum 20. Facet 16 is covered with aluminum layer 22. Facet 18 is covered by reflective aluminum layer 24.

Block 12 also has an output facet 26. Output facet 26 does not include a reflective layer as its purpose is to output light from block 12 into the rest of assembly 10. Output facet 26 is in contact with and optically coupled to the input of a tape member 28 which comprises a base portion 30 and a plurality of individual strips 32 defined between a plurality of cuts 34. Each of the strips 32 has a raised volume or jewel 36 of triangular cross-section, which acts as a source of relatively high intensity light output, as will be described below.

In particular, each jewel 36 has a pair of triangular facets, including triangular facets 38 on one side and an identical triangular facet 40 on the other side. In addition, each jewel 36 has a rectangular window facet 42 which acts to output light.

Distributing block 12 and strips 32 may be made out of the same material, and even molded together in one piece. Suitable materials include any optically clear material, such as polyvinyl chloride or the like. In the case of strips 32, flexibility is also desirable so that strips 32 will easily conform to natural movement of the fabric to which they are adhered, as will be described below.

In accordance with the preferred embodiment of the invention, it is contemplated the light is fed into the system using a light source, such as a light-emitting diode or LED 44 embedded in block 12. Light 46 output from LED 44 reflects against aluminum layers 20 through 24 until it exits as an output ray 48 into base portion 30. Block 12 is shaped in a manner which results in outputting ray 48 in directions substantially parallel to facet 14, thus resulting in the transmission of light at relatively shallow angles into base portion 30 and strips 32. The result is that at points of reflection 50 substantially total internal reflection occurs and there is relative efficiency in the transmission of light through the system.

The result is that a light ray 48 is propagated the length of strips 32 as illustrated most clearly in FIG. 3. However, when a light ray 52 encounters rectangular facet 42, the angle of incidence 54 is greater than the critical angle and light ray 52 exits as an output ray 56. Likewise, other rays with slightly different paths, such as light ray 58, exit as output ray 60 because they meet the same optical condition as the angle of incidence being greater than the critical angle which results in totaled internal reflection, while some rays such as light rays 49, continue through the length of strips 32.

While, in principle, light is output all along the length of strips 32, a far greater portion of light produced by LED 44 is output through window facets 42. Thus, window facets 42 appear to be principal sources and strips 42 may be arranged to form a pattern on a costume, making the light attractive and yet enhancing safety by improving the visibility of a costume when it is being worn by a child.

As noted above, there is, in principle, some leakage of light along the length of the system. This can be a function of surface irregularity in the optical material, an insufficiently high index of refraction, and/or combinations of the same. This problem can be alleviated by coating the material with a reflective layer 62 (such as reflective paint) as illustrated in FIG. 4. It is noted that the bottom surface of the strips is generally stitched facing against the fabric in accordance with the invention. Thus using a coating of reflective material 62 greatly increases the brightness of the system.

An addition, an additional measure of refinement may be achieved by applying a layer of reflective material 64, such as a silver spray, to those portions of the top side of strips 32 where reflection should occur, thus assuring a maximum concentration of light exiting through facets 42. Preferably, the spray is applied on strips 32 in the direction shown by arrow 67, thus decreasing the potential for application of reflective material 64 to facets 42.

In accordance of the present invention, the assembly illustrated in FIG. 1 may be injection molded as a single piece with cuts 34 already included. Alternatively cuts 34 may be made with a knife as a simple ribbon of molded plastic light conductor. Implementation of the system merely involves insertion of an LED 44 (which may be molded integrally into the system by forming the system around the LED during injection molding). Then it is necessary for strips 32 to be secured in place and a source of power such as a battery or transistorized circuit attached to LED 44.

As illustrated FIG. 5, it is contemplated that block 12 and base portion 30 will be located under a piece of plush fabric 66. Plush fabric 66 includes a hole 68 through which strips 32 are passed allowing strips 32 to be sewn into place with jewels 36 exposed to view. Sewing may be done by hand using stitches 70 securing strips 32 to plush fabric 66 over plush hairs 72. Alternatively, if the hairs 72' are long enough and/or strip 32 thin enough, strips 32 may be buried within hairs 72', as illustrated in FIG. 6.

Referring to FIG. 7, an alternative embodiment of the lighting assembly 110 of the present invention is illustrated. In this embodiment, a central light distributing block 112, drives a plurality of light-emitting strips 132 which are integrally molded with block 112.

As illustrated in FIG. 8, block 112 and strips or fingers 132 are in optical communication with each other and are made of an optically transparent material so that they can conduct light in a manner similar to that of a fiber-optic fiber. Light is output by jewels 136 at the output of fingers 132. Escape, from the system of light input into the system by a light-emitting diode 144 is prevented by reflective layers of aluminum 120 and 124.

In accordance with the present invention, it is contemplated that fingers 132 will be of circular cross-section as illustrated in FIG. 9.

The operation of the assembly 110 illustrated in FIGS. 7 and 8 is similar to the operation of the embodiment illustrated in FIGS. 1 through 6. In particular, light emitting diode 144 outputs light 146 which is reflected internally between aluminum wires 120 and 124 and then through fingers 132 until finally exiting jewels 136 as output light ray 156.

In accordance with the present invention, it is contemplated that fingers 132 will be located under a piece of plush fabric 166 as illustrated in FIG. 10. In accordance with the preferred embodiment the end of fingers 132 with its jewel 136 will poke through a hole 168 in plush fabric 166. It is also contemplated that glue 170 will secure fingers 132 to the underside 174 of plush fabric 166. In accordance with the invention, it is also contemplated that fingers 132 may be placed in fur 172 in the manner of FIG. 6.

In accordance with the present invention, it is contemplated that is not necessary that all strips or fingers be of the same shape and size. For example, as illustrated in FIG. 11, fingers 232 in assembly 210 are of different lengths in order to accommodate placement to make a desired pattern. In accordance with this embodiment of the invention, each of the fingers 232 is selected to be a size which results in relatively short lengths between block 212 and output jewels 236.

Use of the assembly 210 of FIG. 11 is illustrated in FIG. 12, where block 210, illustrated in phantom lines because it is located under the sweatshirt 280 of a user such as child 282. Likewise, fingers 232 are also illustrated as phantom lines because they are underneath sweatshirt 280. As noted above, fingers 232 terminate in jewels 236 which poke out through holes in the sweatshirt 280 or other garment and in which they are incorporated.

In accordance with the preferred embodiment, it is also contemplated that jewels 236 may be pointed enough and sharp enough to be able to be pushed through plush fabric or other fabric without the necessity of cutting a separate hole. Also in accordance of the invention, it is contemplated that the same may be glued in position.

More particularly, as illustrated in FIGS. 13 and 14, ends of fingers 332 may be terminated in a hard plastic optical member 336 illustrated schematically in cross-section in FIG. 13. In addition, the structure may include barb 384 which enables jewel 336 to be pushed through fabric 366 and retained therein without the use of glue. In accordance with the present invention, it is contemplated that fingers 332 will be made of a soft resilient material selected for its comfort and ability to be formed into a pattern. Such comfort is enhanced through the use of plush fabric 366. The end of finger 332 is glued into a hole 388. Alternatively, the inside of the hole may be textured and the end of finger 332 jam-fitted. The material of jewel 336, on the other hand, is selected for its rigidness, even with a relatively thin diameter, thus allowing it to act as a needle and be easily pushed through a fabric. Finger 332 and jewel 336 may, alternatively, be constructed of a single piece of compromise material stiff enough to act as a needle and pliable enough to be bent and be comfortable. Knitted fabric is preferred for its ability to receive a needle point like the point 390 of jewel 336. Point 390 should be somewhat rounded to avoid injury and discomfort.

Referring to FIG. 15, it accordance of the present invention it is also contemplated that fingers, such as fingers 442 may be made of two different materials with different indices of refraction with the core 492 having an index of refraction different from the index of refraction of sheath 494. The relationship between the two indices of refraction is selected using the same principles used in the selection of the core and the sheath in conventional fiber-optic structures. The particular selection of indices of refraction are well known to those in the fiber-optic art and form no part of the instant invention. Upon selection of the typical relationship between indices of refraction, improved efficiency in the transmission of light is experienced. Alternatively, a reflective silvery material, such as aluminum, may be used in place of a sheath of different index of refraction.

Finally, fluorescent pigments 598 which when illuminated continue to glow after light falls on them may be used for a added measure of safety. They may be applied to the surface, as illustrated in FIG. 14, or incorporated in the plastic melt. The same may also be done for a light distributing member without a cap as illustrated in FIG. 16, which includes pigment paint spots 598. Pigment sold under the trademark Luminova is believed to yield superior results.

Referring to FIG. 17, yet another variation for the light-emitting end of a light-conducting finger is illustrated. In the embodiment illustrated in FIG. 17, there is no cap. Rather, the shape of the cap is integrally molded into the end 699 of finger 632. In this case, finger 632 is made of a material which is flexible enough to be formed into a desired shape, while at the same time being stiff enough to be able to be poked through a fabric. Such poking through the fabric may be facilitated through the use of a small amount of a suitable lubricant.

While an illustrative embodiment of the present invention has been illustrated, it is understood the various modifications will be obvious to persons of ordinary skill in the art. Such modifications are within the spirit and scope of the invention and are within the scope of this patent which is limited and defined only by the appended claims.

What is claimed is:

1. A light distributing assembly, comprising:
    (a) a light source;
    (b) a plurality of light outputting members optically coupled to said light source, each of said members having a light outputting surface, said light outputting members being made of an optically transmissive material, the index of refraction of said optically transmissive material being selected to result in internal reflection between light traveling the length of said light outputting members on the inside of said light outputting members at the interface between the inside of said light outputting members and the space surrounding said light outputting members, said light outputting members having first and second member ends, said first member end being optically coupled to said light source, each of said members having a light outputting surface on its second member end, wherein said light outputting members having a length;
    (c) a plurality of light outputting caps, said outputting surface being defined on each respective light outputting cap, said light outputting cap being associated with a respective light outputting member and secured to its respective second member end, each of said light outputting caps comprising:
        (i) a tapered member having a first end and a second end, said tapered member tapering along at least a portion of said tapered member to a smaller size from a relatively wide portion adjacent said second end, said first end being relatively pointed and said second end defining a surface shaped to bear against said first side of a fabric;
        (ii) a backing member having first and second surfaces, said first surface being configured to bear against said second side of said fabric;
        (iii) a hole defined in said second surface of said backing member, said hole being configured and dimensioned to receive its respective second member end; and
        (iv) a connection member secured to said first surface of said backing member and said second end of said tapered member, to define a space between said first surface of said backing member and said second end of said tapered member, said space being large enough to accommodate said fabric.

2. A light distributing assembly as in claim 1, wherein the light source is driven by a battery powered transistorized power source which causes the lights to blink or follow any other pattern desired.

3. A light distributing assembly as in claim 2, wherein said light outputting members have first and second member ends, said first member end being optically coupled to said light source, each of said members having a light outputting surface on its second member end, wherein said light outputting members have various lengths, said light outputting members coming in at least four different lengths.

4. A light distributing assembly as in claim 2, wherein each of said light outputting members are elongated and have first and second member ends, said first member end being optically coupled to said light source, each of said members having a light outputting surface on its second member end, wherein said light outputting members have a length defined between said first and second member ends, said second member end being configured to present a surface oriented with respect to light passing through said length to present an angle of incidence greater than the critical angle, whereby a relatively large proportion of light passing through said length is allowed to exit from said light outputting members.

5. A light distributing assembly as in claim 4, wherein said light outputting members are elongated in shape and have first and second member ends, said first member end being optically coupled to said light source, each of said members having a light outputting surface on its second member end, wherein said light outputting members have various lengths, the length of one of said light outputting members being different from the length of at least one other light outputting member.

6. A light distributing assembly as in claim 5, wherein said light outputting members have first and second member ends, each of said first member ends being optically coupled to said light source, said light outputting members being elongated and having a length extending between said first and said second member ends, each of said members having a plurality of light outputting contours along its length, and further comprising a plurality of discontinuities in the shape of said light outputting members, said discontinuities being positioned at a plurality of points along the length of said light outputting members, said discontinuities having at least one surface which is oriented and an angle with respect to radiation traveling inside of said light outputting members, said angle having a value which results in relatively high transmission of radiation traveling inside of said light outputting members, whereby said discontinuities serve as a plurality of output points for light input into the light outputting-member with which they are associated.

7. A light distributing assembly as in claim 4, wherein said light outputting members have first and second member ends, each of said first member ends being optically coupled to said light source, said light outputting members being elongated and having a length extending between said first and said second member ends, each of said members having a plurality of light outputting contours along its length, and further comprising a plurality of discontinuities in the shade of said light outputting members, said discontinuities being positioned at a plurality of points along the length of said light outputting members, said discontinuities having at least one surface which is oriented and an angle with respect to radiation traveling inside of said light outputting members, said angle having a value which results in relatively high transmission of radiation traveling inside of said light outputting members, whereby said discontinuities serve as a plurality of output points for light input into the light outputting member with which they are associated.

8. A garment comprising a light distributing assembly as in claim 4, and further comprising a fabric member secured to said assembly, wherein said light outputting members are made of an optically transmissive material, the index of refraction of said optically transmissive material being selected to result in internal reflection between light traveling the length of said light outputting members on the inside of said light outputting members at the interface between the inside of said light outputting members and the space surrounding said light outputting members.

9. A light distributing assembly as in claim 2, wherein said light outputting members are elongated in shape and have first and second member ends, said first member end being optically coupled to said light source, each of said members having a light outputting surface on its second member end, wherein said light outputting members have various lengths, the length of one of said light outputting members being different from the length of at least one other light outputting member.

10. A light distributing assembly as in claim 9, wherein said light outputting members have first and second member ends, each of said first member ends being optically coupled to said light source, said light outputting members being elongated and having a length extending between said first and said second member ends, each of said members having a plurality of light outputting contours along its length, and further comprising a plurality of discontinuities in the shade of said light outputting members, said discontinuities being positioned at a plurality of points along the length of said light outputting members, said discontinuities having at least one surface which is oriented and an angle with respect to radiation traveling inside of said light outputting members, said angle having a value which results in relatively high transmission of radiation traveling inside of said light outputting members, whereby said discontinuities serve as a plurality of output points for light input into the light outputting member with which they are associated.

11. A garment comprising a light distributing assembly as in claim 9, and further comprising a fabric member secured to said assembly, wherein said light outputting members are made of an optically transmissive material, the index of refraction of said optically transmissive material being selected to result in internal reflection between light traveling the length of said light outputting members on the inside of said light outputting members at the interface between the inside of said light outputting members and the space surrounding said light outputting members.

12. A light distributing assembly as in claim 2, wherein said light outputting members have first and second member ends, each of said first member ends being optically coupled to said light source, said light outputting members being elongated and having a length extending between said first and said second member ends, each of said members having a plurality of light outputting contours along its length, and further comprising a plurality of discontinuities in the shade of said light outputting members, said discontinuities being positioned at a plurality of points along the length of said light outputting members, said discontinuities having at least one surface which is oriented and an angle with respect to radiation traveling inside of said light outputting members, said angle having a value which results in relatively high transmission of radiation traveling inside of said light outputting members, whereby said discontinuities serve as a plurality of output points for light input into the light outputting member with which they are associated.

13. A garment comprising a light distributing assembly as in claim 2, and further comprising a fabric member secured to said assembly, wherein said light outputting members are made of an optically transmissive material, the index of refraction of said optically transmissive material being selected to result in internal reflection between light traveling the length of said light outputting members on the inside of said light outputting members at the interface between the inside of said light outputting members and the space surrounding said light outputting members.

14. A light distributing assembly for mounting on the surface of a fabric having a first side and a second side, said light distributing assembly comprising:

(a) a light source; and (b) a plurality of elongated light outputting members having first and second member ends, said first member end being optically coupled to said light source, each of said members having a light outputting surface on its second member end, wherein said light outputting members have a length, said light outputting members comprising an optically transmissive material having an index of refraction selected to result in reflection of light traveling inside said optically transmissive material and incident on the interface between said optically transmissive material and the space containing said light outputting members;

(c) a plurality of light outputting caps, said outputting surface being defined on each respective light outputting cap, said light outputting cap being associated with a respective light outputting member and secured to its respective second member end, each of said light outputting caps comprising:

(i) a tapered member having a first end and a second end, said tapered member tapering along at least a portion of said tapered member to a smaller size from a relatively wide portion adjacent said second end, said first end being relatively pointed and said second end defining a surface shaped to bear against said first side of said fabric;

(ii) a backing member having first and second surfaces, said first surface being configured to bear against said second side of said fabric;

(iii) a hole defined in said second surface of said backing member, said hole being configured and dimensioned to receive its respective second member end; and (iv) a connection member secured to said first surface of said backing member and said second end of said tapered member, to define a space between said first surface of said backing member and said second end of said tapered member, said space being large enough to accommodate said fabric.

15. A light distributing assembly as in claim 14, wherein said elongated member ends and said holes defined in said second surface of said backing member are secured to each other with adhesive.

16. A light distributing assembly as in claim 14, wherein said first end of said tapered member is sufficiently small dimension as to be easily passed through a fabric.

17. A light distributing assembly as in claim 16, wherein said first end of said tapered member is pointed enough to be easily passed through a loosely woven or knitted fabric.

18. A fabric incorporating a light distributing assembly, comprising:

(a) a light source;

(b) a plurality of light outputting members optically coupled to said light source, each of said members having a light outputting surface, said light outputting members being made of an optically transmissive material, the index of refraction of said optically transmissive material being selected to result in internal reflection between light traveling the length of said light outputting members on the inside of said light outputting members at the interface between the inside of said light outputting members and the space surrounding said light outputting members, said light outputting members having first and second member ends, said first member end being optically coupled to said light source, each of said members having a light outputting surface on its second member end, wherein said light outputting members having a length;

(c) a plurality of light outputting caps, said outputting surface being defined on each respective light outputting cap, said light outputting cap being associated with a respective light outputting member and secured to its respective second member end, each of said light outputting caps comprising:

(i) a tapered member having a first end and a second end, said tapered member tapering along at least a portion of said tapered member to a smaller size from a relatively wide portion adjacent said second end, said first end being relatively pointed and said second end defining a surface shaped to bear against said first side of said fabric;

(ii) a backing member having first and second surfaces, said first surface being configured to bear against said second side of said fabric;

(iii) a hole defined in said second surface of said backing member, said hole being configured and dimensioned to receive its respective second member end; and (iv) a connection member secured to said first surface of said backing member and said second end of said tapered member, to define a space between said first surface of said backing member and said second end of said tapered member, said space being large enough to accommodate said fabric.

19. A light distributing assembly as in claim 18, wherein said light outputting members have first and second member ends, said first member end being optically coupled to said light source, each of said members having a light outputting surface on its second member end, wherein said light outputting members have various lengths, said light outputting members coming in at least four different lengths.

20. A costume made of a flexible material incorporating a light distributing assembly, comprising:

(a) a light source;

(b) a plurality of light outputting members optically coupled to said light source, each of said members having a light outputting surface, said light outputting members being made of an optically transmissive material, the index of refraction of said optically transmissive material being selected to result in internal reflection between light traveling the length of said light outputting members on the inside of said light outputting members at the interface between the inside of said light outputting members and the space surrounding said light outputting members, said light outputting members having first and second member ends, said first member end being optically coupled to said light source, each of said members having a light outputting surface on its second member end, wherein said light outputting members having a length;

(c) a plurality of light outputting caps, said outputting surface being defined on each respective light outputting cap, said light outputting cap being associated with a respective light outputting member and secured to its respective second member end, each of said light outputting caps comprising:

(i) a tapered member having a first end and a second end, said tapered member tapering along at least a portion of said tapered member to a smaller size from a relatively wide portion adjacent said second end, said first end being relatively pointed and said second end defining a surface shaped to bear against said first side of said material;

(ii) a backing member having first and second surfaces, said first surface being configured to bear against said second side of said material;

(iii) a hole defined in said second surface of said backing member, said hole being configured and dimensioned to receive its respective second member end; and (iv) a connection member secured to said first surface of said backing member and said second end of said tapered member, to define a space between said first surface of said backing member and said second end of said tapered member, said space being large enough to accommodate said material.

* * * * *